United States Patent [19]

Sneddon

[11] Patent Number: 4,756,539
[45] Date of Patent: Jul. 12, 1988

[54] COLLAPSIBLE GOLF BUGGY WITH SEAT

[76] Inventor: John Sneddon, 3 O'Grady Place, Wanniassa, Act, 2903, Australia

[21] Appl. No.: 65,920

[22] Filed: Jun. 23, 1987

[30] Foreign Application Priority Data

Jun. 26, 1986 [AU] Australia .............................. PH06572

[51] Int. Cl.$^4$ ............................................... B62B 1/04
[52] U.S. Cl. ..................................... 280/40; 280/655; 280/47.25; 280/DIG. 6
[58] Field of Search ................... 280/DIG. 6, 639, 38, 280/40, 652, 655, 47.17, 47.18., 47.19, 47.25, 47.26, 645, 646, 656, 659

[56] References Cited

U.S. PATENT DOCUMENTS

| 2,599,928 | 6/1952 | Lyons | 280/38 |
|---|---|---|---|
| 2,957,700 | 10/1960 | Beaurline | 280/DIG. 6 X |
| 3,189,364 | 6/1965 | Westphal | 280/DIG. 6 X |
| 4,262,928 | 4/1981 | Leitzel | 280/47.26 X |

FOREIGN PATENT DOCUMENTS

| 62385/86 | 3/1987 | Australia . |
|---|---|---|
| 64253/86 | 4/1987 | Australia . |
| 488116 | 11/1952 | Canada . |
| 536328 | 1/1957 | Canada . |
| 690871 | 7/1964 | Canada . |
| 662270 | 12/1951 | United Kingdom . |
| 863109 | 3/1961 | United Kingdom . |
| 879833 | 10/1961 | United Kingdom . |

Primary Examiner—David M. Mitchell
Assistant Examiner—Tamara L. Finlay
Attorney, Agent, or Firm—Balogh, Osann, Kramer, Dvorak, Genova & Traub

[57] ABSTRACT

A foldable golf buggy having a lower frame member supported by wheels, an upper frame member pivotally mounted to said lower frame member to swing between an upright position and a folded position lying adjacent to the lower frame member, the upper frame including an attachment to which is pivotally affixed one end of an elongate buggy handle; at least one strut member pivotally affixed at one end thereof to the lower frame member and extending up to and past the attachment alongside said handle to be captured by the attachment whereby, when said handle is moved forwardly, the attachment acts as a guide following at least one strut member as the upper frame member is moved into its folded position. The golf buggy may be provided with a seat which is also foldable and allows for ease in transportation.

4 Claims, 3 Drawing Sheets

COLLAPSIBLE GOLF BUGGY WITH SEAT

FIELD OF THE INVENTION

This invention relates to golf buggies, in particular to a form of buggy which can be folded for ready transportation.

DESCRIPTION OF THE PRIOR ART

Buggies for carrying golf bags are well known.

One example of such a bag is Australian Patent specification No. 64253/86. This specification discloses a buggy for carrying a golf bag or the like including a main frame providing a bag supporting structure, a bag supporting base located at or adjacent a lower end of said frame and a bag locating means located at or adjacent an upper end thereof, a sub-frame pivotally connected to said main frame for movement relative thereto between an unfolded position and a folded position, said pivotal connection being located between said upper and lower ends and having its axis extending transverse to an axis of said main frame which extends between said upper and lower ends, two ground engaging wheels attached to said sub-frame for rotation relative thereto about a substantially common axis which is substantially parallel to said pivotal connection axis, said wheels being located in axially spaced relationship so that each is adjacent a respective one of two opposite lateral extremities of said main frame, and manually operable actuating means which is connected to both said frames and is operative to cause said relative movement of the sub-frame, the arrangement being such that in said unfolded position said sub-frame projects laterally away from a rear side of said main frame and when in said folded position said sub-frame is positioned to place said wheel axis forwardly of at least part of said main frame so that each said wheel is located on a respective opposite side of a bag positioned on said main frame.

Another type of golf bag carrier is described in Australian Patent Specification No. 62385/86. In that specification there is disclosed a golf bag carrier comprising:

a flexible spine for absorbing and impeding transmission of shock in the carrier, the spine having upper and lower ends, the spine including golf bag securing means for securing a golf bag thereto;

a pair of wheeled side struts each having an inner and an outer end, each side strut being pivotally joined at its inner end to the spine intermediate of the upper and lower ends, each of the side struts being adapted for movement between an extended operating position and a retracted folded position;

guide means associated with each side strut for supporting each strut and guiding it between its operating and folding positions;

shock-absorbing connecting means interposed between the side struts and the spine for connecting the struts to the spine and for absorbing shock therebetween, the shock-absorbing connecting means including locking means to permit locking of the side struts in the folded position; and handle means pivotally connected to the upper end of the spine for guiding the carrier, the handle means being interposed between the operator and the spine to prevent the transmission of the shock to the operator.

This invention provides a much simpler and less expensive golf buggy which may be collapsed or erected by pushing/pulling the buggy handle as will appear hereinafter.

SUMMARY OF THE INVENTION

In one broad form of the invention there is provided a golf buggy comprising a lower frame member supported by wheel means, an upper frame member pivotally mounted to said lower frame member to swing between an upright position and a folded position lying adjacent to said lower frame member, said upper frame member including attachment means to which is pivotally affixed one end of an elongate buggy handle means; at least one strut member pivotally affixed at one end thereof to said lower frame member and extending up to and past said attachment means alongside said handle means to be captured by said attachment means whereby when said handle means is moved forwardly said attachment means acts as a guide following said at least one strut member as said upper frame member is moved into its folded position.

BRIEF REFERENCE TO THE DRAWINGS

A better understanding of the construction and operation of the buggy of the invention can be gained from a consideration of the accompanying drawings in which FIG. 1 shows the buggy in the configuration of normal use;

DETAILED DESCRIPTION OF THE PREFERRED EMBODIMENT

Figure 1:
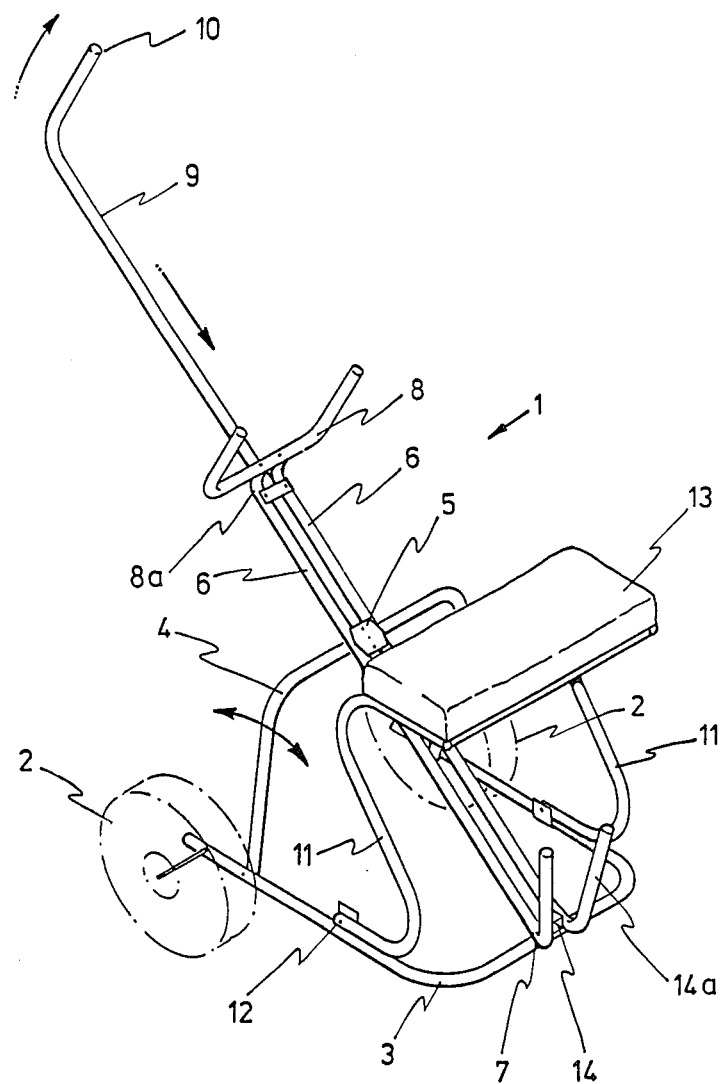

Referring to the drawings, a golf buggy 1 comprises a pair of wheels 2 pivotally (on an axle or like mounting) supporting a lower frame member 3. A frame member 4 is pivotally attached at its lower ends to member 3, and is swingable in the direction (to and fro) of the arrow as shown in FIG. 1. The buggy arm 9 with handle 10 at its lower end has affixed thereto member 5 which is attached to the upper portion of member 4 by a pivot joint which enables relative rotation as member 4 moves into the position shown in FIG. 2. Members 6 (in the form of struts) are joined at their upper end to member 8 which constitutes a holder for a bag of clubs (see FIG. 3) and terminate at their lower ends in upraised positions 14, 14a to form a retainer for said bag (see FIG. 3). At their lower ends they are also pivotally attached to lower frame member 3 as at 7. Members 6 are slidably moveable with respect to member 5 as member 4 pivots. A seat 13 is attached via arms 11 and pivot bracket arrangements 12 to lower member 3. The seat 13 is pivoted to arms 11 at their upper ends as at 16. A golf club bag 15 with club 17 is shown for completeness in FIG. 3.

Figure 2:
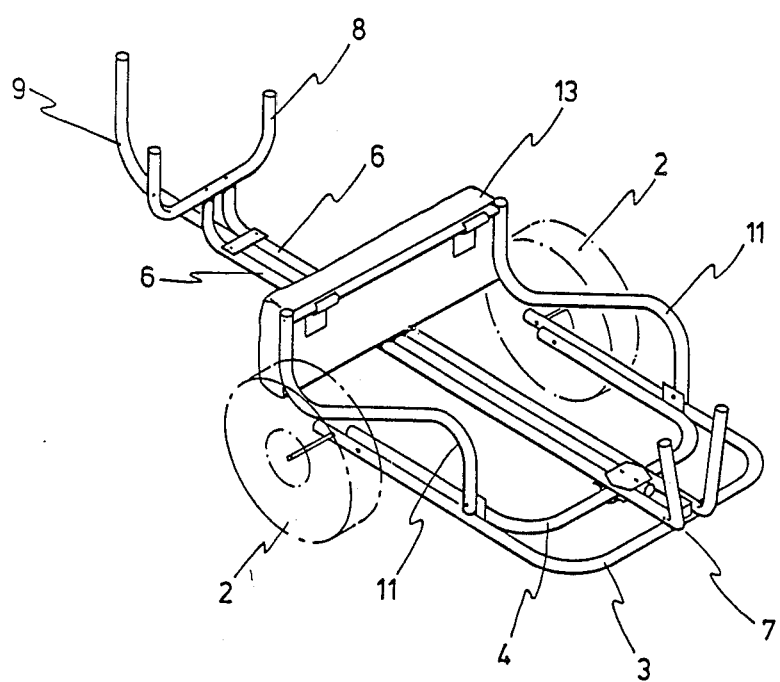
FIG. 2 shows the buggy in folded configuration.
Figure 3:
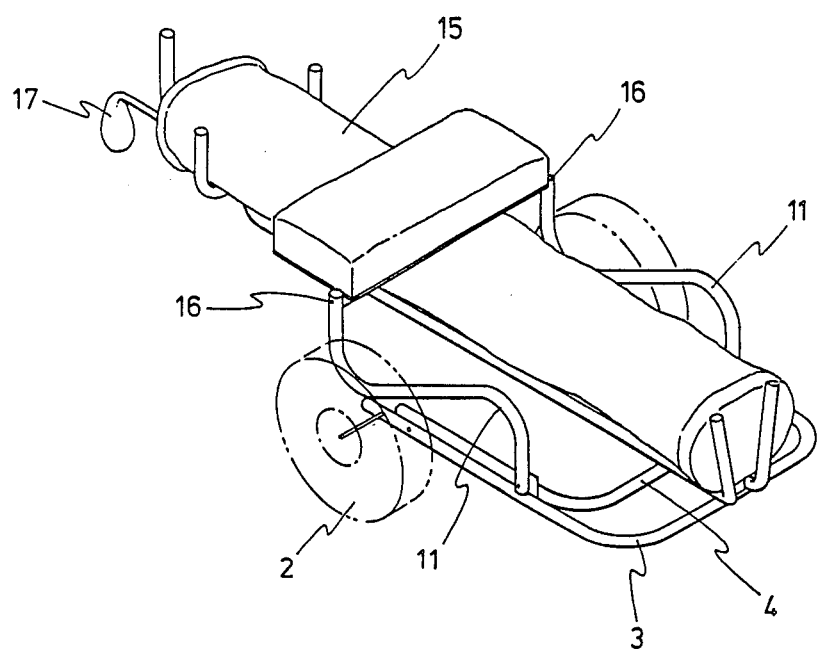
FIG. 3 shows the buggy in folded configuration with a bag of clubs.

In use, buggy arm or handle 9 is slideable (see arrow in FIG. 1) between members 6 and along 4—for preference, the bracket 8a supporting arms 8 extends under handle 9 to assist stability during sliding. Downward sliding movement of handle 9 pivots member 4 into its folded position (FIGS. 2 and 3), also enabling handle 9 to pivot downwardly. Subsequently, the seat 13 can be folded back into position as shown in FIG. 2. Finally, if a golf bag is being carried, seat 13 can be folded about pivots 16 into the position shown in FIG. 3. FIG. 2 shows the buggy in its most compact configuration, and FIG. 3 is its most compact configuration when carrying a bag of clubs.

When the cart is unfolded, the spine carrier (6—6), the base frame member (3) and the leg frame member (4) form an inverted triangle with the wheels at the apex. The downward force generated by the weight of the golf bag and clubs acts to push the base frame member and the leg frame member apart. To fold the cart, it is necessary to relieve the wheels of the weight of the bag and clubs by tilting the cart rearwards with the bottom of the lower frame member (3) on the ground until the wheels clear the ground when the handle can be pushed downward to initiate the folding action.

Thus, the cart is held in its unfolded position by the weight of the golf bag and clubs. While the wheels are in contact with the ground, the cart cannot accidentally fold. The buggy is gravity collapsible.

For preference, the various members are constructed of tubular metal e.g. aluminum alloy, steel or plastics material, and the wheels are of rubber tyred construction.

What is claimed is:

1. A golf buggy comprising a lower frame member supported by wheel means, an upper frame member pivotally mounted to said lower frame member to swing between an upright-position and a folded position lying adjacent to said lower frame member, said upper frame member including attachment means to which is pivotally affixed one end of an elongate buggy handle means; a pair of spaced strut members pivotally affixed at one end thereof to said lower frame member and extending up to and past said attachment means alongside said handle means, said strut members being arranged on either side of said attachment means, and said handle means slides between said strut members during folding, said attachment means slidably securing said handle means whereby, when said handle means is moved forwardly, said attachment means acts as a guide following said strut members as said upper frame member is moved into its folded position.

2. A golf buggy as defined in claim 1, wherein there are means at upper and lower ends of said strut members forming holding means for a golf club bag.

3. A golf buggy as defined in claim 1, including seat means, said seat means being mounted on arms pivotally mounted to said lower frame member whereby when said buggy is in folded condition, said seat may be folded back on to the buggy frame.

4. A golf buggy as defined in claim 2, including seat means, said seat means being mounted on arms pivotally mounted to said lower frame member whereby when said buggy is in folded condition, said seat may be folded back on to the buggy frame.

* * * * *